US006950739B2

(12) United States Patent
Matsubara et al.

(10) Patent No.: US 6,950,739 B2
(45) Date of Patent: Sep. 27, 2005

(54) MOTOR CONTROLLER OF DECELERATION IDLING-CYLINDER ENGINE VEHICLE

(75) Inventors: Atsushi Matsubara, Utsunomiya (JP); Hideyuki Takahashi, Utsunomiya (JP); Kan Nakaune, Nasu-gun (JP); Toshinari Shinohara, Utsunomiya (JP); Naoya Miyamoto, Kawachi-gun (JP); Shinichi Kitajima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/489,426

(22) PCT Filed: Sep. 10, 2002

(86) PCT No.: PCT/JP02/09198

§ 371 (c)(1),
(2), (4) Date: Sep. 14, 2004

(87) PCT Pub. No.: WO03/025372

PCT Pub. Date: Mar. 27, 2003

(65) Prior Publication Data

US 2005/0010353 A1 Jan. 13, 2005

(30) Foreign Application Priority Data

Sep. 14, 2001 (JP) ....................................... 2001-280588

(51) Int. Cl.[7] .................................................. G05D 1/00

(52) U.S. Cl. ....................... 701/103; 701/104; 701/112; 701/113; 701/114; 123/179.3; 123/179.4; 123/198 F; 180/65.2

(58) Field of Search ................................ 701/103, 104, 701/112, 113, 114; 123/90.15, 90.18, 406.5, 406.53, 179.3, 179.4, 481, 198 F; 180/65.2

(56) References Cited

U.S. PATENT DOCUMENTS 5,769,054 A * 6/1998 Schnaibel et al. ..... 123/406.47

FOREIGN PATENT DOCUMENTS

| | | |
|---|---|---|
| JP | 61-66820 | 4/1986 |
| JP | 3-253745 | 11/1991 |
| JP | 8-177537 | 7/1996 |
| JP | 10-318107 | 12/1998 |
| JP | 10-331749 | 12/1998 |
| JP | 11-350995 | 12/1999 |
| JP | 2001-73821 | 3/2001 |

* cited by examiner

*Primary Examiner*—Tony M. Argenbright
*Assistant Examiner*—Johnny H. Hoang
(74) *Attorney, Agent, or Firm*—Arent Fox PLLC

(57) ABSTRACT

A motor control device for a vehicle having a deceleration deactivatable engine which includes at least one deactivatable cylinder which is deactivated during a deceleration traveling of the vehicle, and which is started by a motor when the operation thereof transitions from a deceleration deactivation operation to a normal operation. The motor control device comprises a cylinder deactivation state determining section (S202) for determining whether or not the engine is in a cylinder deactivation state, a cylinder deactivation executing section, a cylinder deactivation operation detecting section (S201) for detecting whether or not the cylinder deactivation executing section is activated, and a starting torque setting section (S201–S204) for setting staring torque for starting the engine by the motor. When it is determined, by the cylinder deactivation state determining section, that the engine is in a cylinder deactivation state, and it is determined, by the cylinder deactivation operation detecting section, that the engine is to return to the fuel supply operation, the starting torque setting section sets a smaller staring torque than in the case of a normal operation. Accordingly, the output of the motor is optimally set when the operation transitions from the cylinder deactivation operation to the normal operation; thus, a smooth drivability and an improved fuel consumption efficiency can be obtained.

4 Claims, 11 Drawing Sheets

MOTOR CONTROLLER OF DECELERATION IDLING-CYLINDER ENGINE VEHICLE

FIELD OF THE INVENTION

The present invention relates to a motor control device for a vehicle having a deceleration deactivatable engine, and in particular, relates to a motor control device for a vehicle in which starting or assisting of the engine by a motor can be smoothly performed when an engine operation transitions from a deceleration deactivation operation to a normal operation in which none of the cylinders of the engine is deactivated.

DESCRIPTION OF RELATED ART

A hybrid vehicle having not only an engine but also an electric motor as the drive source has been known in the art. As a type of hybrid vehicle, a parallel hybrid vehicle is known that uses an electric motor as an auxiliary drive source for assisting the engine output.

In the parallel hybrid vehicle, the power of the engine is assisted by the electric motor during acceleration traveling. On the other hand, during deceleration traveling, the battery or the like is charged via a deceleration regenerating operation while fuel supply to the engine is stopped (generally known as deceleration fuel-cut operation). According to various control operations including the above, the remaining battery charge (remaining electric energy) of the battery is maintained while also satisfying the driver's demands. Because the drive train of the parallel hybrid vehicle comprises the engine and the motor coupled to the engine in series, the whole system is simple in structure, light in weight, and has great flexibility for installation in a vehicle.

In one of the above-mentioned parallel hybrid vehicles, a motor-started control process or a motor-assisted control process, in which the engine is started not by a starter motor but by a power assist motor for the engine, is known.

Note that the above-mentioned motor-started control process includes not only literally a starting control process conventionally performed by a starter motor in which the engine is started from its stopped state, but also a torque assisting control process in which the power of the engine is assisted when the engine operation transitions from the above-mentioned fuel-cut operation to a self-running operation in which fuel supply is restarted.

On the other hand, a deceleration deactivation (cylinder deactivation during deceleration) control process as an engine friction reduction method has been proposed. By using this control process, it is possible to deactivate at least one cylinder during a deceleration fuel-cut operation, and to increase regenerated energy by an amount corresponding to reduction in engine friction as a result of cylinder deactivation so as to increase efficiency in energy recovery.

However, because, for example, in the above-mentioned motor-started control process or motor-assisted control process, assisting torque is adjusted so as to be balanced with engine friction at the moment, a drawback is experienced in that when the above-mentioned motor-started control process or motor-assisted control process is applied, without modification, to a vehicle having deceleration deactivatable cylinders, the transition from a deceleration deactivation operation to a normal operation cannot be smoothly performed.

In other words, because the engine friction is reduced during the deceleration deactivation operation, a drawback is experienced that if the motor-started control process or motor-assisted control process is performed so as to assist the engine torque as in the normal operation, fuel consumption efficiency may be degraded because the engine may run too fast or the consumed electrical energy may be too great due to an excessively high torque.

SUMMARY OF THE INVENTION

In view of the above circumstances, the present invention relates to a control process during transitions in engine operation from a deceleration deactivation operation to a normal operation, and in particular, an objective thereof is to provide a motor control device for a vehicle having a deceleration deactivatable engine, with which the output power of the motor may be optimally set when the engine operation transitions from a deceleration deactivation operation to a normal operation so that the fuel consumption efficiency can be improved.

In order to achieve the above object, the present invention provides a motor control device for a vehicle having a deceleration deactivatable engine, wherein, during a deceleration traveling of the vehicle, a fuel cut operation is applied to the engine, as well as a deceleration cylinder deactivation operation in which at least one cylinder is deactivated in accordance with a running state of the engine, and the engine is started by a motor when the operation of the engine transitions from the fuel cut operation to a fuel supply operation, the motor control device comprising: a cylinder deactivation state determining section for determining whether or not the engine is in a cylinder deactivation state; a cylinder deactivation executing section for executing the cylinder deactivation operation of the engine; a cylinder deactivation operation detecting section for detecting whether or not the cylinder deactivation executing section is activated; and a starting torque setting section for setting staring torque for starting the engine by the motor, wherein when it is determined, by the cylinder deactivation state determining section, that the engine is in a cylinder deactivation state, and it is determined, by the cylinder deactivation operation detecting section, that the engine is to return to the fuel supply operation, the starting torque setting section sets a smaller staring torque than in the case in which the engine returns to the fuel supply operation from a state in which it is determined, by the cylinder deactivation state determining section, that the engine is not in a cylinder deactivation state.

Accordingly, unnatural increase in engine revolution rate can be avoided, which will occur in the case in which the normal starting torque is applied by the motor when the engine does not completely return to the normal operation state, and also an excessive torque is prevented from being applied.

The starting torque may be preferably set in accordance with the running speed of the engine.

Accordingly, by setting the starting torque in accordance with the engine revolution rate which has a great influence on starting performance of the engine, the minimum starting torque required for starting can be set.

Furthermore, the starting torque may be preferably set to a fixed value up to a predetermined engine revolution rate rate, may be set so as to decrease as the engine revolution rate increases for the engine revolution rate greater than the predetermined value, and may be set to another fixed value for the engine revolution rate greater than an idling revolution.

Accordingly, the transition from the deceleration cylinder deactivation operation to the normal operation can be smoothly performed.

Moreover, the vehicle is preferably a hybrid vehicle, and the motor is preferably provided to drive the vehicle.

BRIEF DESCRIPTION OF THE DRAWINGS

FIG. 8A shows a cross-section of the main part of the variable valve timing mechanism in a cylinder activation state, and FIG. 8B shows a cross-section of the main part of the variable valve timing mechanism in a cylinder deactivation state.

DESCRIPTION OF THE PREFERRED EMBODIMENTS

The preferred embodiments of the present invention will be explained below with reference to the appended drawings.

Figure 1:
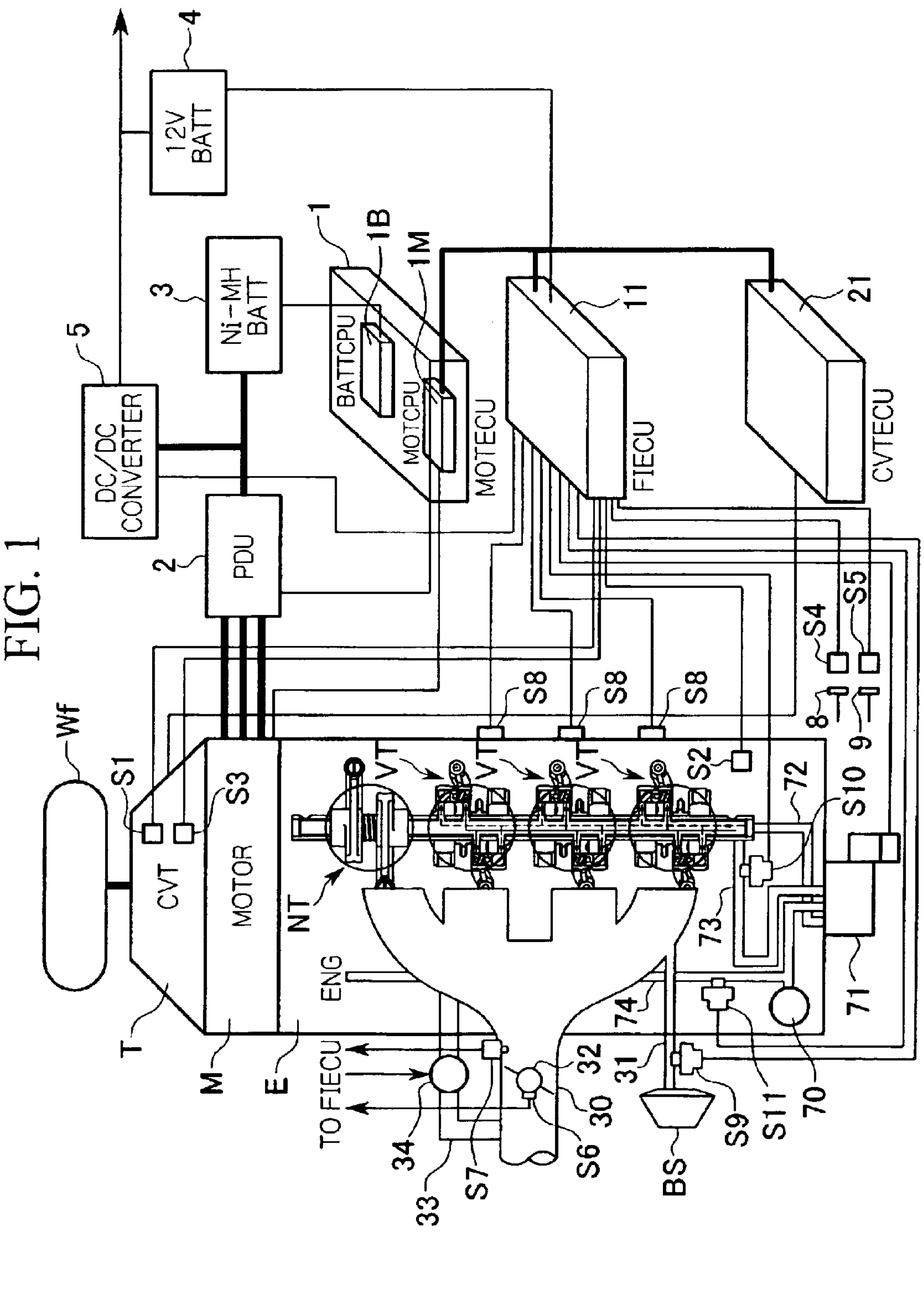
FIG. 1 is a block diagram showing the general structure of a hybrid vehicle in an embodiment according to the present invention.

FIG. 1 is a block diagram schematically illustrating a parallel hybrid vehicle in a first embodiment of the present invention, in which an engine E, an electric motor M, and a transmission T are directly coupled to each other in series. The driving force generated by both the engine E and the electric motor M is transmitted via, for example, a CVT (continuously variable transmission) as the transmission T (the transmission T may be a manual transmission) to front wheels Wf as driving wheels. When the driving force is transmitted from the driving wheels Wf to the electric motor M during deceleration of the hybrid vehicle, the electric motor M functions as a generator for applying a so-called regenerative braking force to the vehicle, i.e., the kinetic energy of the vehicle is recovered and stored as electric energy. Note that elements related to both a vehicle having a manual transmission and a vehicle having a CVT are shown in FIG. 1 for convenience in explanation.

The driving of the motor M and the regenerating operation of the motor M are controlled by a power drive unit (PDU) 2 according to control commands from a motor CPU 1M of a motor ECU 1. A high-voltage nickel metal hydride battery 3 for sending and receiving electric energy to and from the motor M is connected to the power drive unit 2. The battery 3 includes a plurality of modules connected in series, and in each module, a plurality of cell units are connected in series. The hybrid vehicle includes a 12-volt auxiliary battery 4 for energizing various accessories. The auxiliary battery 4 is connected to the battery 3 via a downverter 5 or a DC-DC converter. The downverter 5, controlled by an FIECU 11, makes the voltage from the battery 3 step-down and charges the auxiliary battery 4. Note that the motor ECU 1 comprises a battery CPU 1B for protecting the battery 3 and calculating the remaining battery charge thereof. In addition, a CVTECU 21 is connected to the transmission T, which is a CVT, for controlling the same.

The FIECU 11 controls, in addition to the motor ECU 1 and the downverter 5, a fuel injection valve (not shown) for controlling the amount of fuel supplied to the engine E, a starter motor, ignition timing, etc. To this end, the FIECU 11 receives various signals such as a signal from a speed sensor S1 for sensing vehicle speed VP, a signal from an engine revolution rate speed sensor S2 for sensing engine revolution rate speed NE, a signal from a shift position sensor S3 for sensing the shift position of the transmission T, a signal from a brake switch S4 for detecting the operation of a brake pedal 8, a signal from a clutch switch S5 for detecting the operation of a clutch pedal 9, a signal from a throttle opening-degree sensor S6 for sensing the degree of throttle opening TH of a throttle valve 32, a signal from an intake negative pressure sensor S7 for sensing negative pressure in the air-intake passage, a signal from a knocking sensor S8, and the like.

Reference symbol BS indicates a booster associated with the brake pedal, in which a master vac negative pressure sensor S9 is provided for sensing negative pressure in the brake master vac (hereinafter referred to as master vac negative pressure). The master vac negative pressure sensor S9 is connected to the FIECU 11.

Note that the intake negative pressure sensor S7 and the throttle opening-degree sensor S6 are provided in an air-intake passage 30, and the master vac negative pressure sensor S9 is provided in a communication passage 31 connected to the air-intake passage 30.

The air-intake passage 30 is provided with a secondary air passage 33 for air communication between the upstream portion with respect to the throttle valve 32 and the downstream portion, and the secondary air passage 33 is provided with a control valve 34. The purpose of providing the secondary air passage 33 is to supply a small amount of air into the cylinders even when the air-intake passage 30 is completely closed by the throttle valve 32. The control valve 34 is controlled by means of the signal from the FIECU 11 in accordance with the intake negative pressure measured by the intake negative pressure sensor S7. A POIL (oil pressure) sensor S10, a solenoid of a spool valve 71, and a TOIL (oil temperature) sensor S11, all of which will be explained below, are also connected to the FIECU 11.

The engine E includes three cylinders associated with the variable valve timing mechanism (i.e., a cylinder deactivation section) VT on both an intake side and an exhaust side, and a cylinder associated with a conventional valve mechanism NT which has no relation to the cylinder deactivation operation.

In other words, the engine E is a deactivatable engine in which the operation state may be alternated between normal operation in which all four cylinders including three deactivatable cylinders are active and a cylinder deactivation operation in which three deactivatable cylinders are inactive. In the engine E, the operation of the intake valves IV and exhaust valves EV associated with the deactivatable cylinders can be temporarily stopped by means of the variable valve timing mechanism VT.

Next, the variable valve timing mechanism VT will be explained in detail with reference to FIGS. 7 to 9.

Figure 7:
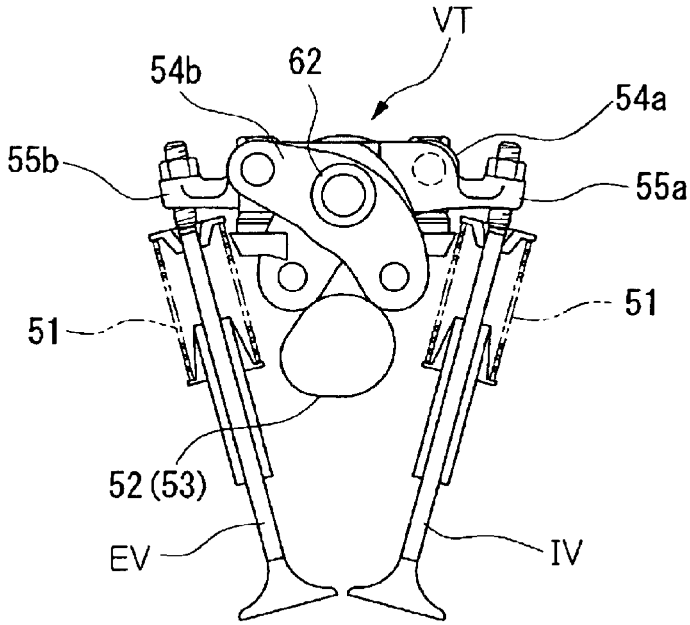
FIG. 7 is a front view showing a variable valve timing mechanism used in the embodiment of the present invention.

FIG. 7 shows an example of an SOHC engine provided with the variable valve timing mechanism VT which is adapted for a cylinder deactivation operation. The cylinder (not shown) is provided with the intake valve IV and the exhaust valve EV which are biased by valve springs 51 and 51 in a direction which closes the intake port (not shown) and exhaust port (not shown), respectively. Reference symbol 52 indicates a lift cam provided on a camshaft 53. The lift cam 52 is engaged with an intake cam lifting rocker arm 54*a* for lifting the intake valve and an exhaust cam lifting rocker arm 54*b* for lifting the exhaust valve, both of which are rockably supported by a rocker arm shaft 62.

Figure 8A:
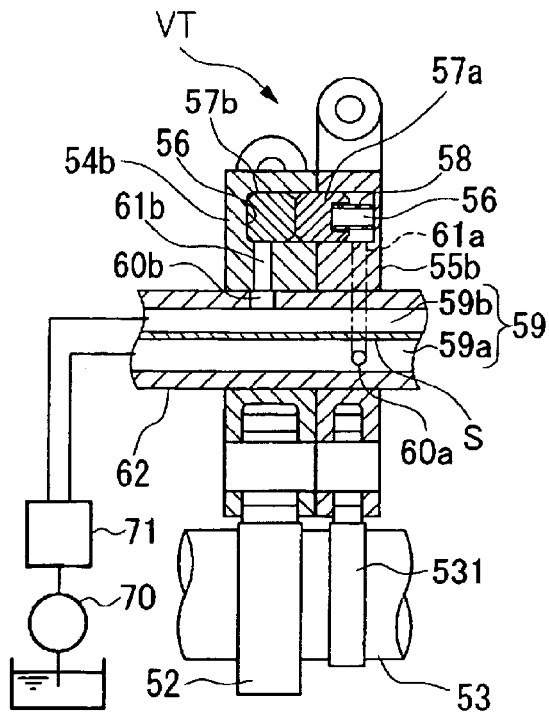
FIGS. 8A and 8B show the variable valve timing mechanism used in the embodiment of the present invention; in particular.
Figure 8B:
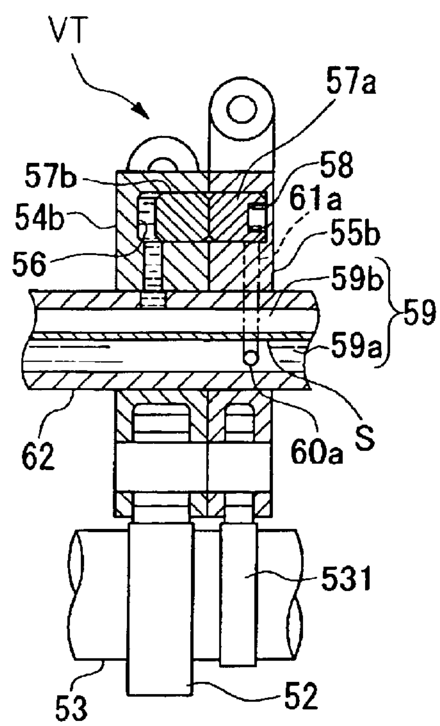

The rocker arm shaft 62 also supports valve operating rocker arms 55*a* and 55*b* in a rockable manner, which are located adjacent to the cam lifting rocker arms 54*a* and 54*b,* and whose rocking ends press the top ends of the intake valve IV and the exhaust valve EV, respectively, so that the intake valve IV and the exhaust valve EV open their respective ports. As shown in FIGS. 8A and 8B, the proximal ends (opposite the ends contacting the valves) of the valve operating rocker arms 55*a* and 55*b* are adapted so as to be able to engage a circular cam 531 provided on the camshaft 53.

FIGS. 8A and 8B show, as an example, the cam lifting rocker arm 54*b* and the valve operating rocker arm 55*b* provided in the exhaust valve side. As shown in FIGS. 8A and 8B, a hydraulic chamber 56 is formed in the cam lifting rocker arm 54*b* and the valve operating rocker arm 55*b* in a continuous manner, which is located on the opposite side of the rocker arm shaft 62 with respect to the lift cam 52. The hydraulic chamber 56 is provided with a pin 57*a* and a disengaging pin 57*b* both of which are slidable and biased toward the cam lifting rocker arm 54*b* by means of a pin spring 58.

The rocker arm shaft 62 is provided with, in its inside, a hydraulic passage 59 which is divided into hydraulic passages 59*a* and 59*b* by a partition S. The hydraulic passage 59*b* is connected to the hydraulic chamber 56 at the position where the disengaging pin 57*b* is located via an opening 60 of the hydraulic passage 59*b* and a communication port 61*b* in the cam lifting rocker arm 54*b*. The hydraulic passage 59*a* is connected to the hydraulic chamber 56 at the position where the pin 57*a* is located via an opening 60 of the hydraulic passage 59*a* and a communication port 61*a* in the valve operating rocker arm 55*b,* and is adapted to be further connectable to a drain passage (not shown).

As shown in FIG. 8A, the pin 57*a* is positioned by the pin spring 58 so as to bridge the cam lifting rocker arm 54*b* and the valve operating rocker arm 55*b* when hydraulic pressure is not applied via the hydraulic passage 59*b*. On the other hand, when hydraulic pressure is applied via the hydraulic passage 59*b* in accordance with a cylinder deactivation signal, both of the pin 57*a* and the disengaging pin 57*b* slide toward the valve operating rocker arm 55*b* against the biasing force of the pin spring 58, and the interface between the pin 57*a* and the disengaging pin 57*b* corresponds to the interface between the cam lifting rocker arm 54*b* and the valve operating rocker arm 55*b* to disconnect these rocker arms 54*b* and 55*b,* as shown in FIG. 8B. The intake valve side is also constructed in a similar manner. The hydraulic passages 59*a* and 59*b* are connected to an oil pump 70 via the spool valve 71 which is provided for ensuring hydraulic pressure of the variable valve timing mechanism VT.

Figure 9:
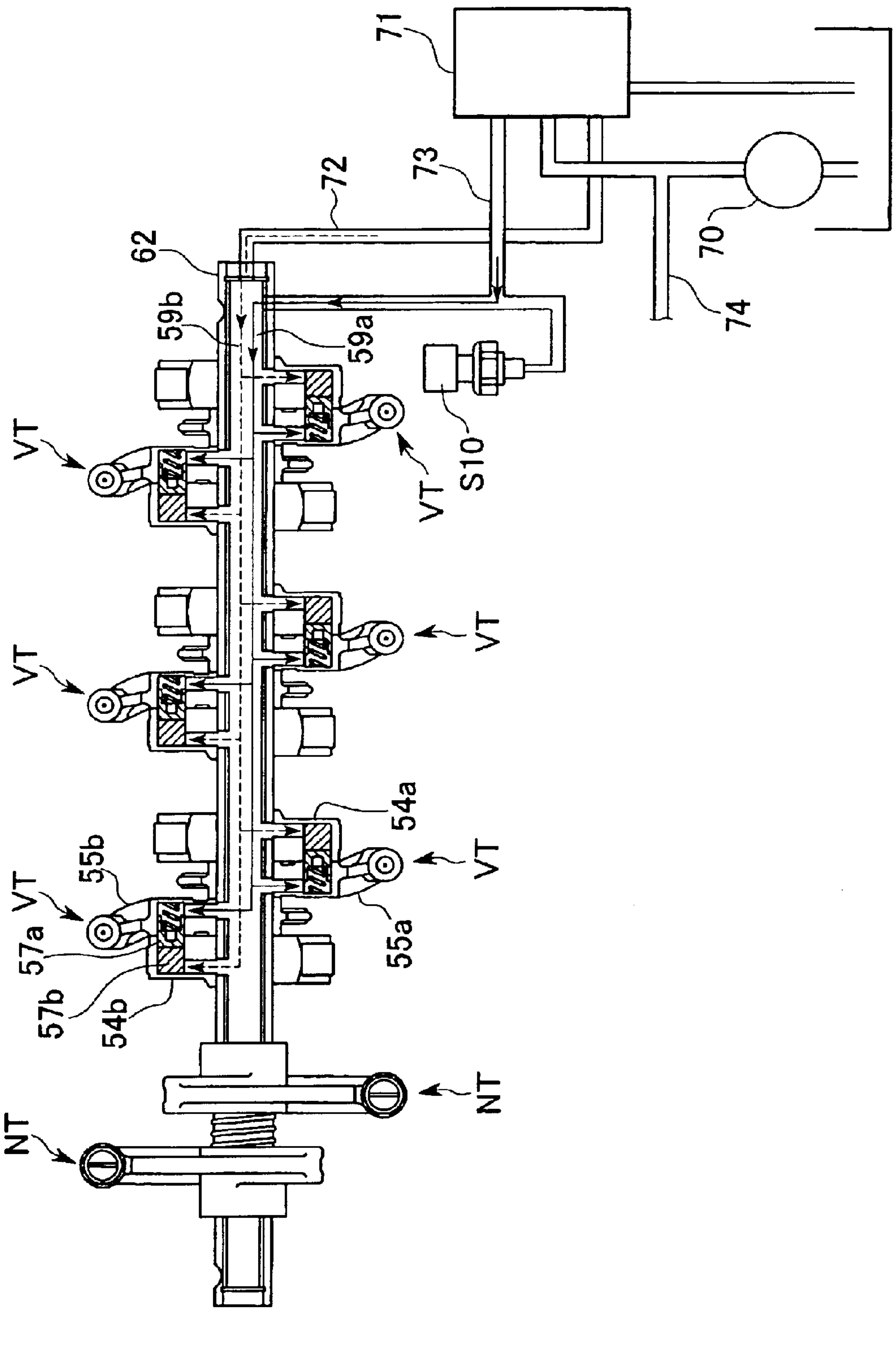
FIG. 9 is an enlarged view of the main part in FIG. 1.

As shown in FIG. 9, a passage for deactivation 72 branching from the spool valve 71 is connected to the hydraulic passage 59*b* in the rocker arm shaft 62, and a passage for canceling deactivation 73 branching from the spool valve 71 is connected to the hydraulic passage 59*a*. The POIL sensor S10 is connected to the passage for canceling deactivation 73. The POIL sensor S10 monitors hydraulic pressure in the passage for canceling deactivation 73, which exhibits low values during a deactivation operation and exhibits high values during normal operation. The TOIL sensor S11 (shown in FIG. 1) is connected to an oil supplying passage 74 which branches from a passage connecting the outlet of the oil pump 70 and the spool valve 71 and which supplies operating oil to the engine E so as to monitor the temperature of the operating oil.

When the condition for entering into a cylinder deactivation operation, which will be described below, is satisfied, the spool valve 71 is operated in accordance with a. signal from the FIECU 11, and hydraulic pressure is applied to the hydraulic chamber 56 via the oil pump 70 and the hydraulic passage 59*b* in both the intake valve and exhaust valve sides. Subsequently, the pins 57*a,* which have been bridging the cam lifting rocker arms 54*a,* 54*b* and the valve operating rocker arms 55*a* and 55*b* together with the disengaging pin 57*b* and slide toward the valve operating rocker arms 55*a* and 55*b,* and the cam lifting rocker arms 54*a* and 54*b* and the valve operating rocker arms 55*a* and 55*b* are disconnected.

In this state, although the cam lifting rocker arms 54*a* and 54*b* are driven by the rotating lift cam 52, the movements are not transmitted to the valve operating rocker arms 55*a* and 55*b* which have been disconnected from the cam lifting rocker arms 54*a* and 54*b*. As a result, because the valve operating rocker arms 55*a* and 55*b* are not driven and the intake valve IV and the respective ports of the exhaust valve EV remain closed, a deceleration deactivation operation of the engine can be performed.

Operation for switching into deceleration deactivation operation

Figure 2:
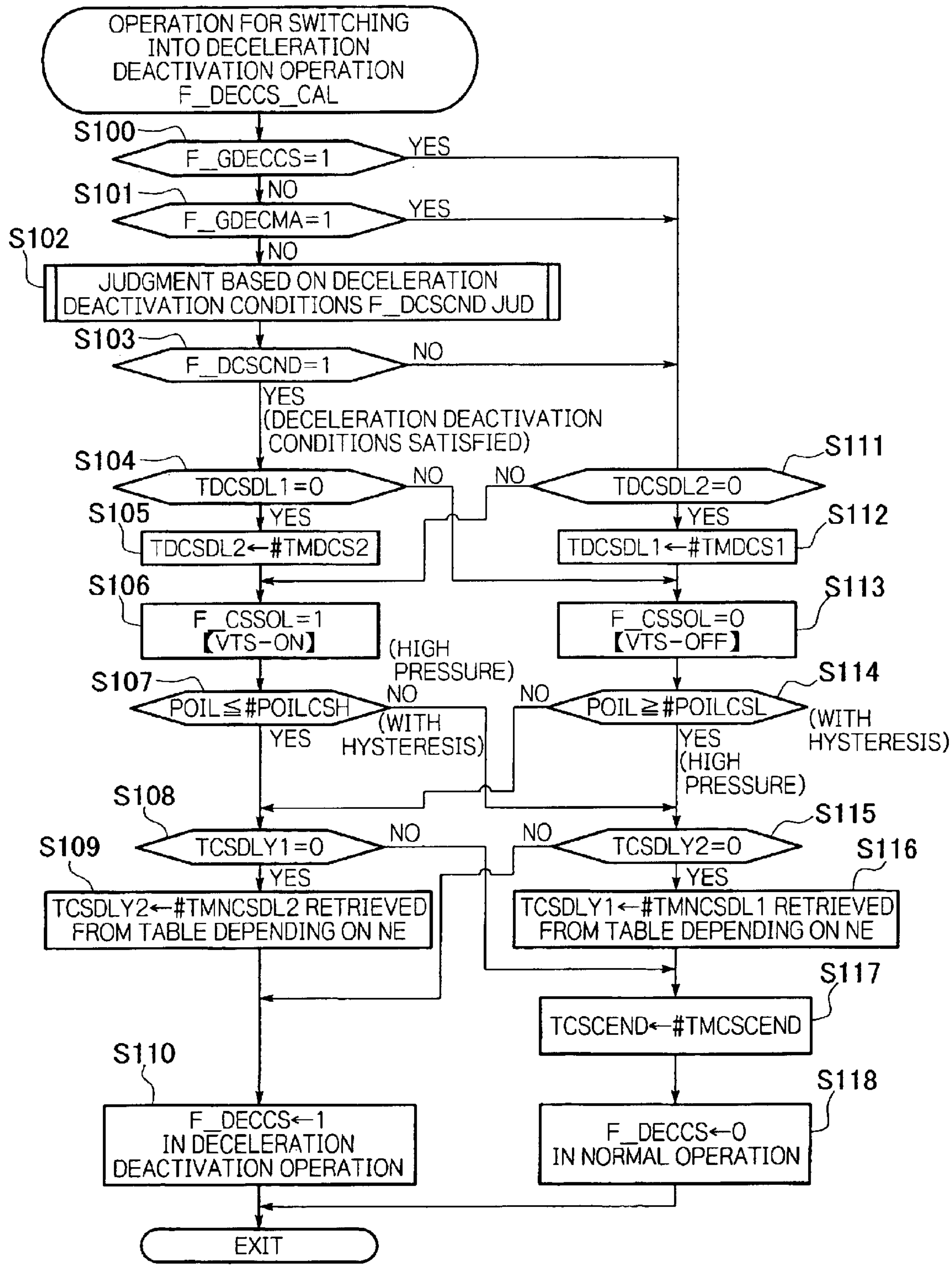
FIG. 2 is a flowchart showing the operation for switching into a deceleration deactivation operation in the embodiment of the present invention.

Now, the operation for switching into a deceleration deactivation operation will be explained with reference to FIG. 2.

The term "deceleration deactivation operation" herein means an engine operation state in which both of the intake and exhaust valves remain in their closing positions by means of the variable valve timing mechanism VT under predetermined conditions during regenerated deceleration, and it is performed in order to reduce engine friction and to increase the energy regenerated during deceleration. In the flowchart shown in FIG. 2, a flag (i.e., cylinder deactivation executing flag F_DECCS) used to alternate the engine operation state between a deceleration deactivation operation and an all-cylinder operation (normal operation) in which all cylinders are active is set and reset at a predetermined period.

In step S100, it is determined whether the value of a flag F_GDECCS is "1". The flag F_GDECCS is provided since cancellation of the cylinder deactivation operation is required when the degree of deceleration is relatively great.

When the result of the determination in step S100 is "YES", the operation proceeds to step S111, and when the result is "NO", the operation proceeds to step S101.

In step S101, it is determined whether the value of a flag F_GDECMA (included in the deceleration state determining section) is "1". The flag F_GDECMA is provided since cancellation of regenerated deceleration is required when the degree of deceleration is relatively great. When the result of the determination in step S101 is "YES", the operation proceeds to step S111, and when the result is "NO", the operation proceeds to step S102.

The reason for providing the determination in step S101 is that it is better not to execute the cylinder deactivation operation when stopping of the vehicle has the highest priority. When a braking operation of high deceleration is applied, negative pressure in the master vac is greatly reduced (i.e., the absolute pressure is increased), and subsequently, there is a high probability that the engine operation state may return to normal operation from the cylinder deactivation operation; therefore, the cylinder deactivation operation should be cancelled during high deceleration traveling.

The reason for providing the determination in step S101 is that it is better not to execute the cylinder deactivation operation in order to prevent wheel skidding by a regenerative braking during high deceleration traveling.

In step S102, the operation for judgment whether the conditions permitting the deceleration deactivation operation, which will be explained below, are satisfied is executed, and the operation proceeds to step S103.

In step S103, it is determined whether the value of a flag F_DCSCND, which indicates that the conditions for deceleration deactivation operation are satisfied, is "1". When the result of the determination in step S103 is "NO", which means that the conditions for the deceleration deactivation operation are not satisfied, the operation proceeds to step S111, and when the result is "YES", which means that the conditions for the deceleration deactivation operation are satisfied, the operation proceeds to step S104.

In step S104, it is determined whether the value of a solenoid ON delay timer TDCSDL1, which will be explained below, is "0". When the result of the determination in step S104 is "YES", which means that a predetermined period has passed, the operation proceeds to step S105, and when the result is "NO", which means that a predetermined period has not passed, the operation proceeds to step S113.

In step S105, a predetermined value #TMDCS2 is set in a solenoid OFF delay timer TDCSDL2 for the spool valve 71, then the operation proceeds to step S106. This procedure is performed in order to ensure that a certain period of time has passed from completion of the determination in step S103 to completion of the OFF operation of the solenoid for the spool valve 71, when the engine operation is alternated from the deceleration deactivation operation to the normal operation.

In step S106, the flag F_CSSOL of the solenoid for the cylinder deactivation operation is set to "1", i.e., the solenoid for the cylinder deactivation operation in the spool valve 71 is set to be ON, then the operation proceeds to step S107. This flag is set to "1" when the solenoid for the cylinder deactivation operation of the spool valve 71 is set to be ON, and is set to "0" when the solenoid is set to be OFF.

In step S107, it is determined by the POIL sensor S10 whether hydraulic pressure is actually produced after the solenoid for the cylinder deactivation operation was set to be ON. Specifically, it is determined whether or not engine oil pressure POIL is equal to or less than cylinder deactivation permissible oil pressure #POILCSH. When the result of the determination in step S107 is "YES", the operation proceeds to step S108, and when the result is "NO" (there is hysteresis), the operation proceeds to step S115. An oil pressure switch may be provided for the determination instead of the POIL sensor S10.

In step S108, it is determined whether the value of a cylinder deactivation execution delay timer TCSDLY1 is "0" in order to ensure that a certain period of time has passed from when the spool valve 71 is switched on to when oil pressure is produced. When the result of the determination in step S108 is "YES", the operation proceeds to step S109, and when the result is "NO", the operation proceeds to step S117.

In step S109, a timer value #TMNCSDL2, which is retrieved from a table depending on the engine running speed NE, is set in a cylinder deactivation cancellation delay timer TCSDLY2. The reason for setting the timer value #TMNCSDL2 depending on the engine running speed NE is that the oil pressure response changes depending on the engine running speed NE. Therefore, the lower the engine running speed NE is, the greater the timer value #TMNCSDL2 is.

In step S110, the cylinder deactivation executing flag F_DECCS is set to "1", which means that the deceleration deactivation operation is executed, and the control operation of this flow is terminated.

In step S111, it is determined whether the value of the solenoid OFF delay timer TDCSDL2 is "0". When the result of the determination in step S111 is "YES", which means that a predetermined period has passed, the operation proceeds to step S112, and when the result is "NO", which means that a predetermined period has not passed, the operation proceeds to step S106.

In step S112, a predetermined value #TMDCS1 is set in the solenoid ON delay timer TDCSDL1 for the spool valve 71, then the operation proceeds to step S113. This procedure is performed in order to ensure that a certain period of time has passed from completion of the determination in step S103 to an ON operation of the solenoid for the spool valve 71 in step S106 when the engine operation is alternated from the deceleration deactivation operation to normal operation.

In step S113, the flag F_CSSOL of the solenoid for the cylinder deactivation operation is set to "0", i.e., the solenoid for the cylinder deactivation operation in the spool valve 71 is set to be OFF, then the operation proceeds to step S114.

In step S114, it is determined by the POIL sensor S10 whether hydraulic pressure is actually reduced after the solenoid for the cylinder deactivation operation was set to be OFF. Specifically, it is determined whether or not engine oil pressure POIL is equal to or greater than cylinder deactivation cancellation oil pressure #POILCSL. When the result of the determination in step S117 is "YES", which means that engine oil pressure POIL is at the high pressure side (there is hysteresis), the operation proceeds to step S115, and when the result is "NO", the operation proceeds to step S108. An oil pressure switch may be provided for the determination instead of the POIL sensor S10.

In step S115, it is determined whether the value of the cylinder deactivation cancellation delay timer TCSDLY2 is "0" in order to ensure that a certain period of time has passed from when the spool valve 71 is switched off to when oil pressure is reduced. When the result of the determination in step S115 is "YES", the operation proceeds to step S116, and when the result is "NO", the operation proceeds to step S110.

In step S116, a timer value #TMNCSDL1, which is retrieved from a table depending on an engine running speed NE, is set in the cylinder deactivation execution delay timer TCSDLY1, then the operation proceeds to step S117. The reason for setting the timer value #TMNCSDL1 depending on the engine running speed NE is that the oil pressure response changes depending on the engine running speed NE. Therefore, the lower the engine running speed NE is, the greater the timer value #TMNCSDL1 is.

In step S117, a timer value #TMCSCEND is set in a cylinder deactivation compulsory cancellation timer TCSCEND, then the operation proceeds to step S118. The cylinder deactivation compulsory cancellation timer TCSCEND is provided to compulsorily cancel the cylinder deactivation operation when a predetermined period has passed since the beginning of the cylinder deactivation operation.

In step S118, the cylinder deactivation executing flag F_DECCS is set to "0", which means that the normal operation is being executed, and the control operation of this flow is terminated.

Figure 3:
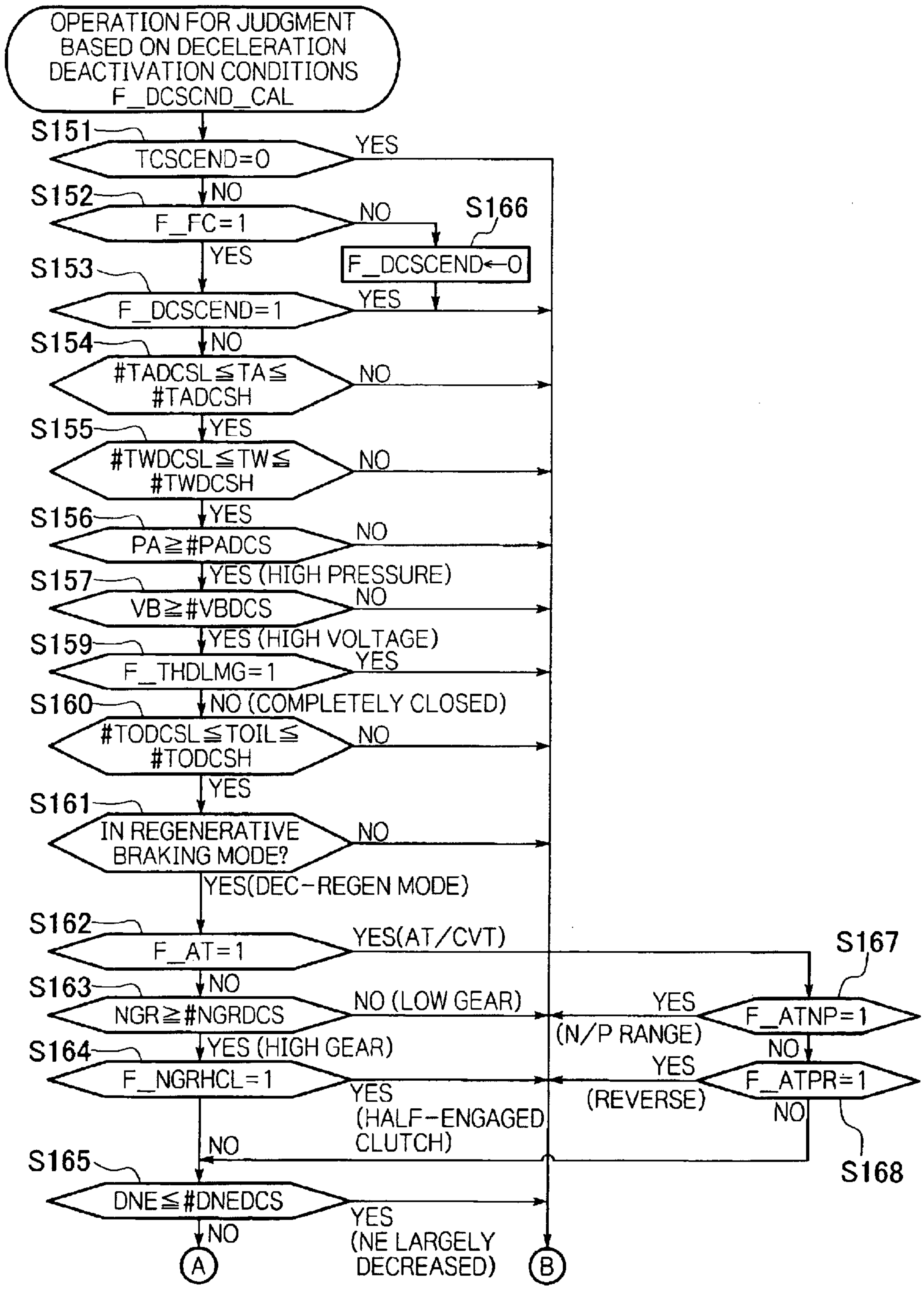
FIG. 3 is a flowchart showing the operation for determining whether the conditions permitting the deceleration deactivation operation are satisfied in the embodiment of the present invention.

Operation for judgment whether the conditions permitting the deceleration deactivation operation are satisfied Next, the operation for judgment whether the conditions permitting the deceleration deactivation operation are satisfied in step S102 shown in FIG. 2 will be explained with reference to FIGS. 3 to 5. In this operation, the flag F_DCSCND, which indicates that the conditions for deceleration deactivation operation are satisfied, is set or reset by continuously monitoring whether or not the conditions for deceleration deactivation operation are satisfied. This operation will be repeated at a predetermined period.

In step S151, it is determined whether the value of the cylinder deactivation compulsory cancellation timer TCSCEND is "0". When the result of the determination in step S151 is "YES", the operation proceeds to step S184 shown in FIG. 5, and when the result is "NO", the operation proceeds to step S152, because the cylinder deactivation operation should be cancelled when the value of the cylinder deactivation compulsory cancellation timer TCSCEND is "0".

In step S152, it is determined whether the value of the fuel cut-off flag F_FC is "1". When the result of the determination in step S152 is "YES", the operation proceeds to step S153, and when the result is "NO", the operation proceeds to step S166. This procedure is provided because the purpose of the cylinder deactivation operation is to further obtain regenerated energy corresponding to the reduction in engine friction resulting when the fuel supply is stopped during deceleration traveling.

Figure 5:
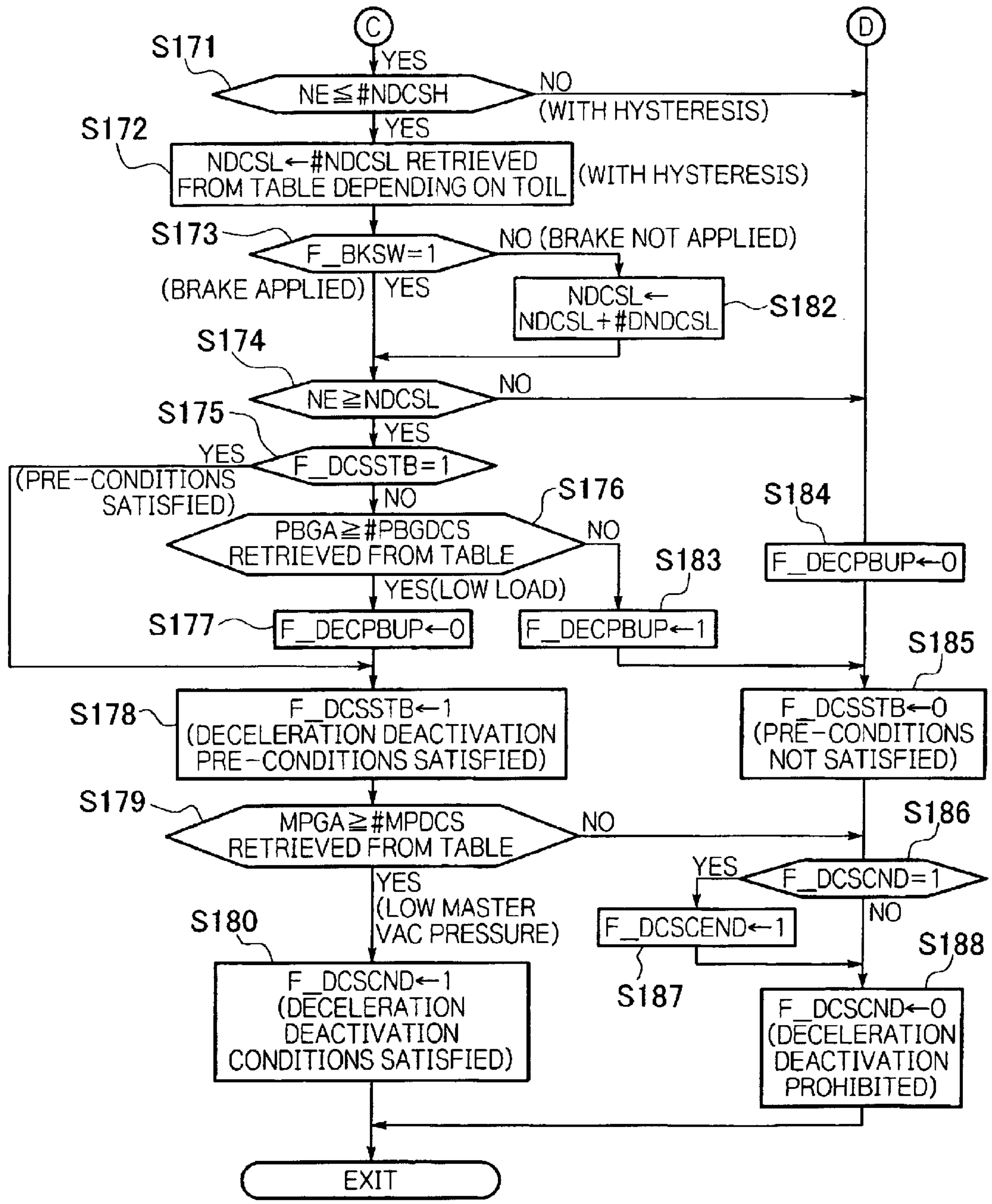
FIG. 5 is a flowchart showing the operation for determining whether the conditions permitting the deceleration deactivation operation are satisfied in the embodiment of the present invention.

In step S166, a cylinder deactivation ending flag F_DCSCEND is set to "0", then the operation proceeds to step S184 shown in FIG. 5.

In step S153, it is determined whether the value of the cylinder deactivation ending flag F_DCSCEND is "1". When the result of the determination in step S153 is "YES", the operation proceeds to step S184 shown in FIG. 5, and when the result is "NO", the operation proceeds to step S154.

In step S154, it is determined whether ambient temperature TA is within a predetermined range, i.e., whether the ambient temperature TA satisfies the following inequality: (lowest permissible ambient temperature for cylinder deactivation #TADCSL)≦TA≦(highest permissible ambient temperature for cylinder deactivation #TADCSH). When it is determined, in step S154, that the ambient temperature TA is within the predetermined range, the operation proceeds to step S155. When it is determined that the ambient temperature TA is out of the predetermined range, the operation proceeds to step S184 shown in FIG. 5. This procedure is provided because the cylinder deactivation operation may make the engine unstable when ambient temperature TA is below the lowest permissible ambient temperature for cylinder deactivation #TADCSL or when the ambient temperature TA is above the highest permissible ambient temperature for cylinder deactivation #TADCSH.

In step S155, it is determined whether cooling water temperature TW is within a predetermined range, i.e., whether cooling water temperature TW satisfies the following inequality: (lowest permissible cooling water temperature for cylinder deactivation #TWDCSL)≦TA≦(highest permissible cooling water temperature for cylinder deactivation #TWDCSH). When it is determined, in step S155, that the cooling water temperature TW is within the predetermined range, the operation proceeds to step S156. When it is determined that the cooling water temperature TW is out of the predetermined range, the operation proceeds to step S184 shown in FIG. 5. This procedure is provided because the cylinder deactivation operation may make the engine unstable when cooling water temperature TW is below the lowest permissible cooling water temperature for cylinder deactivation #TWDCSL or when the cooling water temperature TW is above the highest permissible cooling water temperature for cylinder deactivation #TWDCSH.

In step S156, it is determined whether ambient pressure PA is equal to or greater than a lowest permissible ambient pressure for cylinder deactivation #PADCS. When the result of the determination in step S156 is "YES", which means that the ambient pressure PA is in higher side, the operation proceeds to step S157, and when the result is "NO", the operation proceeds to step S184 shown in FIG. 5. This procedure is provided because it is undesirable to execute the cylinder deactivation operation when the ambient pressure is relatively low. For example, when the cylinder deactivation operation is executed under such a condition, negative pressure in the master vac for the brake system may not be ensured to be sufficient for the braking operation.

In step S157, it is determined whether voltage VB of the 12-volt auxiliary battery 4 is equal to or greater than a lowest permissible voltage for cylinder deactivation #VBDCS. When the result of the determination instep S157 is "YES", which means that the voltage VB is in greater side, the operation proceeds to step S159, and when the result is "NO", the operation proceeds to step S184 shown in FIG. 5. This procedure is provided because the response of the spool valve 71 is degraded when the voltage VB of the 12-volt auxiliary battery 4 is relatively low. In addition, this procedure is provided in order to protect the auxiliary battery 4 when the voltage thereof is decreased under a low ambient temperature or when the auxiliary battery 4 is deteriorated.

In step S159, it is determined whether the value of an idling indication flag F_THIDLMG is "1". When the result of the determination in step S159 is "YES", which means that the throttle of the engine is not completely closed, the operation proceeds to step S184 shown in FIG. 5, and when the result is "NO", which means that the throttle of the engine is completely closed, the operation proceeds to step S160. This procedure is provided to cancel the cylinder deactivation operation even when the throttle is slightly opened from a completely closed state so that marketability of the vehicle is enhanced.

In step S160, it is determined whether oil temperature TOIL (the temperature of the engine oil) is within a predetermined range, i.e., whether the oil temperature TOIL satisfies the following inequality:

(lowest permissible oil temperature for cylinder deactivation #TODCSL)≦TOIL≦(highest permissible oil temperature for cylinder deactivation #TODCSH). When it is determined, in step S160, that the oil temperature TOIL is within the predetermined range, the operation proceeds to step S161. When it is determined that oil temperature TOIL is out of the predetermined range, the operation proceeds to step S184 shown in FIG. 5. This procedure is provided because the response in alternation between normal operation and the cylinder deactivation operation of the engine may be unstable if the cylinder deactivation operation is executed when the oil temperature TOIL is below the lowest permissible oil temperature for cylinder deactivation #TODCSL or when the oil temperature TOIL is above the highest permissible oil temperature for cylinder deactivation #TODCSH.

In step S161, it is determined whether deceleration regeneration is being performed. When the result of the determination in step S161 is "YES", the operation proceeds to step S162, and when the result is "NO", the operation proceeds to step S184 shown in FIG. 5. This procedure is provided because the purpose of the cylinder deactivation operation is to further obtain regenerated energy corresponding to the reduction in engine friction resulting when the fuel supply is stopped during deceleration traveling.

In step S162, it is determined whether the value of an MT/CVT indication flag F_AT is "1". When the result of the determination in step S162 is "NO", which means that the present vehicle employs an MT (manual transmission), the operation proceeds to step S163, and when the result is "YES", which means that the present vehicle employs an AT (automatic transmission) or a CVT, the operation proceeds to step S167.

In step S167, it is determined whether the value of an in-gear indication flag F_ATNP is "1". When the result of the determination in step S167 is "NO", which means that the vehicle is in driving mode, the operation proceeds to step S168, and when the result is "YES", which means that the transmission is in N (neutral) or P (parking) position, the operation proceeds to step S184 shown in FIG. 5.

In step S168, it is determined whether the value of a reverse position indication flag F_ATPR is "1". When the result of the determination in step S168 is "YES", which means that the transmission is in reverse position, the operation proceeds to step S184 shown in FIG. 5, and when the result is "NO", which means that the transmission is in a position other than the reverse position, the operation proceeds to step S165.

Through the procedures in steps S167 and S168, the cylinder deactivation operation is cancelled in N/P or reverse position.

In step S163, it is determined whether the previous gear position NGR is equal to or higher than a lowest permissible gear position for cylinder deactivation #NGRDCS (e.g., third gear). When the result of the determination in step S163 is "YES", i.e., higher gear position, the operation proceeds to step S164, and when the result is "NO", i.e., lower gear position, the operation proceeds to step S184 shown in FIG. 5. This procedure is provided because the regeneration efficiency is reduced in low gear positions, and to avoid a frequent alternation into the cylinder deactivation operation when the vehicle is in a traffic jam.

In step S164, it is determined whether the value of a half-engaged clutch indication flag F_NGRHCL is "1". When the result of the determination in step S164 is "YES", which indicates a half-engaged clutch state, the operation proceeds to step S184 shown in FIG. 5, and when the result is "NO", the operation proceeds to step S165. By providing this procedure, it is possible to avoid undesirable cylinder deactivation operations which may cause an engine stall when the clutch is placed in a half-engaged state to stop the vehicle, or an insufficient acceleration performance when the clutch is placed in a half-engaged state for gear position shifting to accelerate the vehicle.

In step S165, it is determined whether an engine revolution rate decrease amount DNE is equal to or smaller than a highest permissible engine revolution rate decrease amount for cylinder deactivation #DNEDCS. When the result of the determination in step S165 is "YES", which means that the engine revolution rate is considerably decreased, the operation proceeds to step S184 shown in FIG. 5, and when the result is "NO", the operation proceeds to step S169. This procedure is provided to avoid undesirable cylinder deactivation operations which may cause an engine stall when the engine revolution rate is rapidly decreasing.

Figure 4:
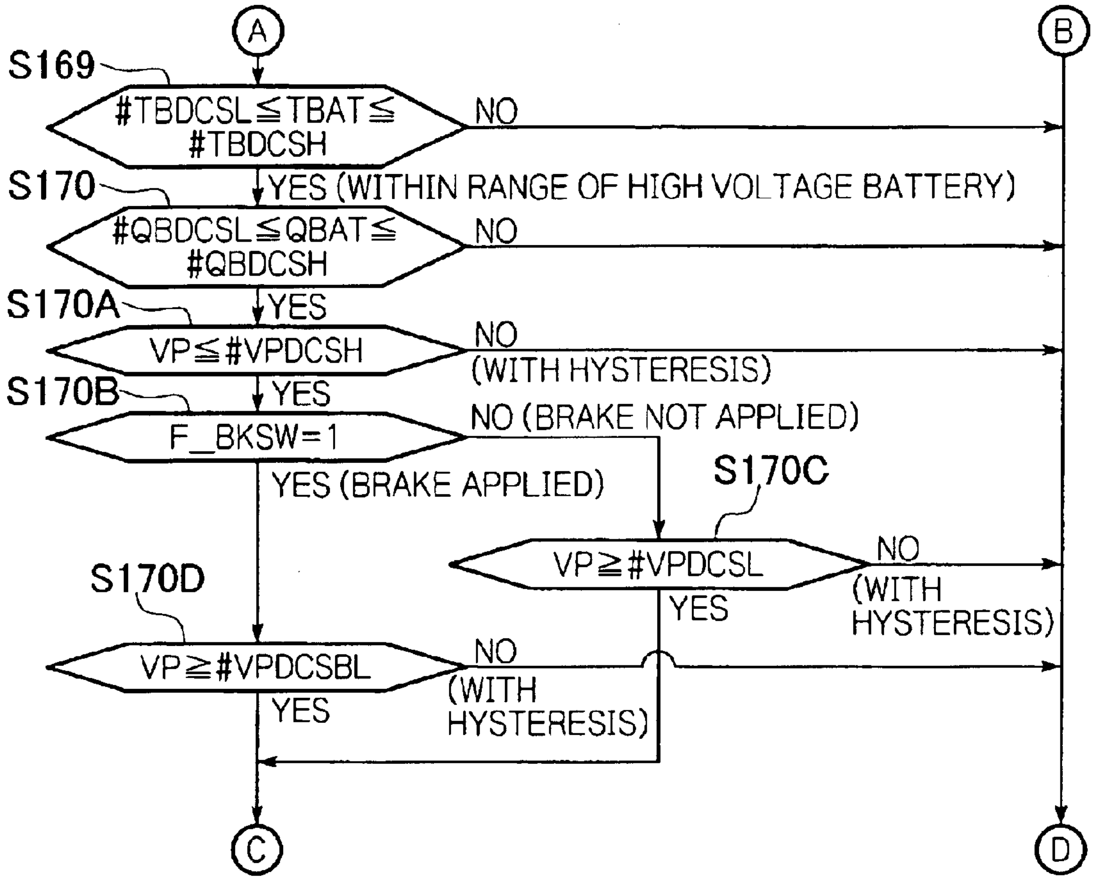
FIG. 4 is a flowchart showing the operation for determining whether the conditions permitting the deceleration deactivation operation are satisfied in the embodiment of the present invention.

In step S169 shown in FIG. 4, it is determined whether battery temperature TBAT of the battery 3 is within a predetermined range, i.e., whether the battery temperature TBAT satisfies the following inequality:

(lowest permissible battery temperature for cylinder deactivation #TBDCSL)≦TBAT≦(highest permissible battery temperature for cylinder deactivation #TBDCSH). When the result of the determination in step S169 is "YES", the operation proceeds to step S170, and when the result is "NO", the operation proceeds to step S184 shown in FIG. 5. This procedure is provided because the cylinder deactivation operation should not be executed when the temperature of the battery 3 is out of the predetermined range in view of protecting the battery.

In step S170, it is determined whether a remaining battery charge QBAT is within a predetermined range, i.e., whether the remaining battery charge QBAT satisfies the following inequality:

(lowest permissible remaining battery charge for continuation of cylinder deactivation #QBDCSL)≦QBAT≦(highest permissible remaining battery charge for continuation of cylinder deactivation #QBDCSH). When it is determined, in step S170, that the remaining battery charge QBAT is within the predetermined range, the operation proceeds to step S170A. When it is determined that the remaining battery charge QBAT is out of the predetermined range, the operation proceeds to step S184 shown in FIG. 5. Accordingly, the cylinder deactivation operation is cancelled when the remaining battery charge QBAT is below the lowest permissible remaining battery charge for cylinder deactivation continuation #QBDCSL, or when the remaining battery charge QBAT is above the highest permissible remaining battery charge for cylinder deactivation continuation #QBDCSH. This procedure is provided because electric energy supplied to the motor M for assisting the engine driving cannot be ensured when the remaining battery charge QBAT is too low, and because regenerated energy cannot be drawn when the remaining battery charge QBAT is too high.

In step S170A, it is determined whether a vehicle speed VP is equal to or below the highest permissible vehicle speed for continuation of cylinder deactivation #VPDCSH. When the result of the determination in step S170A is "YES", the operation proceeds to step S170B, and when the result is "NO" (with hysteresis), the operation proceeds to step S184 shown in FIG. 5.

In step S170B, it is determined whether a brake switch flag F_BKSW is "1". When the result of the determination in step S170B is "YES", which means that the brake of the vehicle is applied, the operation proceeds to step S170D, and when the result is "NO", which means that the brake of the vehicle is not applied, the operation proceeds to step S170C. Note that a brake fluid pressure or the degree of deceleration of the vehicle (i.e., negative acceleration) may be measured to detect a brake activation instead of using the brake switch flag F_BKSW.

In step S170C, it is determined whether the vehicle speed VP is equal to or greater than the lowest permissible vehicle speed for continuation of cylinder deactivation during brake OFF #VPDCSL (e.g., 30 km/h). When the result of the determination in step S170C is "YES", the operation proceeds to step S171 shown in FIG. 5, and when the result is "NO" (with hysteresis), the operation proceeds to step S184 shown in FIG. 5.

In step S170D, it is determined whether the vehicle speed VP is equal to or greater than the lowest permissible vehicle speed for continuation of cylinder deactivation during brake ON #VPDCSBL (e.g., 10 km/h). When the result of the determination in step S170D is "YES", the operation proceeds to step S171 shown in FIG. 5, and when the result is "NO" (with hysteresis), the operation proceeds to step S184 shown in FIG. 5.

The reason of setting the lowest permissible vehicle speed for continuation of cylinder deactivation to be different between when the brake is in the ON state and when the brake is in the OFF state is that the driver of the vehicle may intend to stop the vehicle with high probability when the brake is in the ON state, and the driver may intend to re-accelerate the vehicle when the brake is in the OFF state. Accordingly, the lowest permissible vehicle speed for continuation of cylinder deactivation during brake OFF #VPDCSL is set higher than the lowest permissible vehicle speed for continuation of cylinder deactivation during brake ON #VPDCSBL, whereby the cylinder deactivation operation is more easily executed when the brake is in the ON state than when the brake is in the OFF state, and also the drivability of the vehicle is improved by smoothly reflecting the driver's desire when the driver intends to re-accelerate the vehicle. The above-mentioned lowest permissible vehicle speed for continuation of cylinder deactivation during brake ON #VPDCSBL and lowest permissible vehicle speed for continuation of cylinder deactivation during brake OFF #VPDCSL constitute the reference lowest permissible vehicle speeds.

In step S171, it is determined whether the engine running speed NE is equal to or below a predetermined value, i.e., whether the engine running speed NE satisfies the following inequality:

NE≦(highest permissible engine running speed for continuation of cylinder deactivation #NDCSH). When it is determined, in step S171, that the engine running speed NE is equal to or below a predetermined value, the operation proceeds to step S172. When it is determined that the engine running speed NE is above the predetermined value (with hysteresis), the operation proceeds to step S184.

In step S172, the lowest permissible engine running speed for continuation of cylinder deactivation NDCSL (a reference engine running speed) is retrieved from a #NDCSL table in accordance with the oil temperature TOIL, and the operation proceeds to step S173. The reason for retrieving the lowest permissible engine running speed for continuation of cylinder deactivation NDCSL in such a way, i.e., in accordance with the oil temperature TOIL is that the higher the oil temperature, i.e., the temperature of the engine oil, is, the lower the viscosity of the engine oil is; then, it becomes difficult to apply sufficient pressure, and it is necessary to cancel the deactivation operation earlier, i.e., before the engine running speed becomes too low. By this procedure, an accurate control is realized in accordance with the oil temperature TOIL, i.e., in accordance with the thermal state of the engine. Note that the lowest permissible engine running speed for continuation of cylinder deactivation #NDCSL has hysteresis, and the higher the oil temperature TOIL is, the higher #NDCSL is set.

Note that, instead of the oil temperature TOIL as mentioned above, the temperature of cooling water of the engine or the temperature of the engine itself may be used for setting the lowest permissible engine running speed for continuation of cylinder deactivation #NDCSL.

In step S173, it is determined whether a brake switch flag F_BKSW is "1". When the result of the determination in step S173 is "YES", which means that the brake of the vehicle is applied, the operation proceeds to step S174, and when the result is "NO", which means that the brake of the vehicle is not applied, the operation proceeds to step S182. Note that, as mentioned above, a brake fluid pressure or the degree of deceleration of the vehicle (i.e., negative acceleration) may be measured to detect a brake activation instead of using the brake switch flag F_BKSW.

In step S182, the lowest permissible engine running speed for continuation of cylinder deactivation NDCSL is increased by a predetermined amount of #DNDCSL, and the operation proceeds to step S174. By detecting, to some extent, that the driver intends to stop the vehicle through detecting a brake activation, and by increasing the lowest permissible engine running speed for continuation of cylinder deactivation NDCSL by the predetermined amount of #DNDCSL, the cylinder deactivation operation is more easily executed when the brake is in the ON state than when the brake is in the OFF state, whereby it is possible to smoothly reflect the driver's desire when the driver intends to re-accelerate the vehicle, and thus drivability can be improved.

Note that if the lowest permissible engine running speed for continuation of cylinder deactivation NDCSL can be changed, various ways are possible, for example, the lowest permissible engine running speed for continuation of cylinder deactivation NDCSL may be corrected using multiplying coefficients, or a map may be made for the NDCSL, instead of increasing the lowest permissible engine running speed for continuation of cylinder deactivation NDCSL by an amount of #DNDCSL.

In step S174, it is determined whether the engine running speed NE is equal to or above the lowest permissible engine running speed for continuation of cylinder deactivation NDCSL. When the result of the determination in step S174 is "YES", the operation proceeds to step S175, and when the result is "NO", the operation proceeds to step S184.

In step S175, it is determined whether the value of the cylinder deactivation stand-by flag F_DCSSTB is "1". This flag is set to "1" instep S178 when pre-deactivation conditions are satisfied, and set to "0" in step S185 when the pre-deactivation conditions are not satisfied. When the result of the determination in step S174 is "YES", the operation proceeds to step S178, and when the result is "NO", the operation proceeds to step S176.

In step S176, it is determined whether intake negative pressure PBGA is higher (i.e., closer to atmospheric pressure) than a permissible negative pressure for cylinder deactivation #PBGDCS. The permissible negative pressure for cylinder deactivation #PBGDCS is retrieved from a table which was defined in accordance with the engine running speed NE such that the greater the engine running speed NE, the less (closer to vacuum) the permissible negative pressure #PBGDCS is.

This procedure is provided in order not to immediately execute the cylinder deactivation operation, but to execute the operation after utilizing the intake negative pressure for ensuring negative pressure in the master vac when the load of the engine is considerably great, i.e., the intake negative pressure is lower (closer to vacuum) than the permissible negative pressure #PBGDCS. When the result of the determination in step S176 is "YES" (i.e., low load), the operation proceeds to step S177, and when the result is "NO" (i.e., high load), the operation proceeds to step S183. In step S183, a deceleration intake negative pressure increasing flag F__DECPBUP is set to "1", then the operation proceeds to step S185. When the value of the flag F__DECPBUP is "1", the secondary air passage 33 is closed under certain conditions, and when the value of the flag F__DECPBUP is "0", the secondary air passage 33 is opened under certain conditions.

In other words, when it is determined, in step S176, that the engine is under a high load condition, the secondary air passage 33 is closed (step S183) because the negative pressure is insufficient, the cylinder deactivation operation is not started (step S188), and when it is determined, in step S176, that the intake negative pressure PBGA has reached a predetermined value, the control operation is triggered to proceed to steps S177 and S180, then the pre-deactivation conditions are deemed to be satisfied, i.e., the value of the flag F__DCSCND, which indicates that the conditions for deceleration deactivation operation are satisfied, is set to "1".

In step S177, the deceleration intake negative pressure increasing flag F__DECPBUP is set to "0", then the operation proceeds to step S178. In step S178, because the pre-deactivation conditions are satisfied, the cylinder deactivation stand-by flag F__DCSSTB is set to "1", then the operation proceeds to step S179.

In step S179, it is determined whether the master vac negative pressure MPGA is equal to or lower than (closer to vacuum) the permissible negative pressure for continuation of cylinder deactivation #MPDCS. The permissible negative pressure for continuation of cylinder deactivation #MPDCS is retrieved from a table which was defined depending on the vehicle speeds VP such that the greater the vehicle speed VP, the lower (closer to vacuum) the permissible negative pressure #MPDCS is. The permissible negative pressure #MPDCS is preferably determined in accordance with the kinetic energy of the vehicle, i.e., the vehicle speed, because the master vac negative pressure MPGA is used to stop the vehicle.

When it is determined, in step S179, that the master vac negative pressure MPGA is lower than the permissible negative pressure for continuation of cylinder deactivation #MPDCS, which means that the master vac negative pressure MPGA is closer to vacuum, the operation proceeds to step S180. When it is determined, in step S179, that the master vac negative pressure MPGA is higher than the permissible negative pressure for continuation of cylinder deactivation #MPDCS, which means that the master vac negative pressure MPGA is closer to atmospheric pressure, the operation proceeds to step S186. This procedure is provided because it is undesirable to continue the cylinder deactivation operation when the master vac negative pressure MPGA is not sufficiently low.

In step S180, the flag F__DCSCND, which indicates that the conditions for deceleration deactivation operation are satisfied, is set to "1", then the control operation is terminated.

In step S184, the deceleration intake negative pressure increasing flag F__DECPBUP is set to "0", then the operation proceeds to step S185.

In step S185, because the pre-deactivation conditions are not satisfied, the cylinder deactivation stand-by flag F__DCSSTB is set to "0", then the operation proceeds to step S186.

In step S186, it is determined whether the value of the flag F__DCSCND, which indicates that the conditions for deceleration deactivation operation are satisfied, is "1". When the result of the determination is "YES", the operation proceeds to step S187, and when the result is "NO", the operation proceeds to step S188.

In step S187, a cylinder deactivation ending flag F__DCSCEND is set to "1", and then the operation proceeds to step S188.

In step S188, the flag F__DCSCND, which indicates that the conditions for deceleration deactivation operation are satisfied, is set to "0", and then the control operation is terminated.

Motor Starting Output Determination Operation

Figure 6:
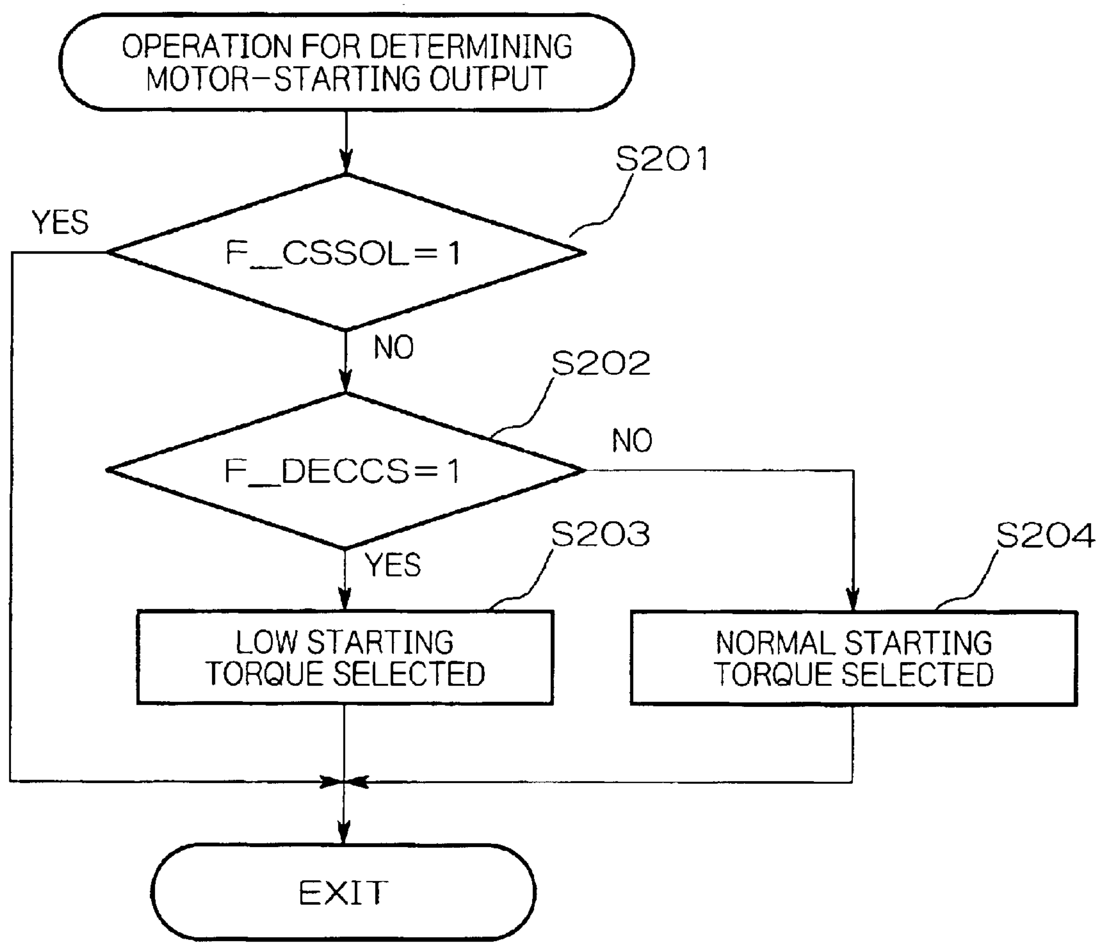
FIG. 6 is a flowchart showing the operation for determining the motor-starting power in the embodiment of the present invention.
Figure 11:
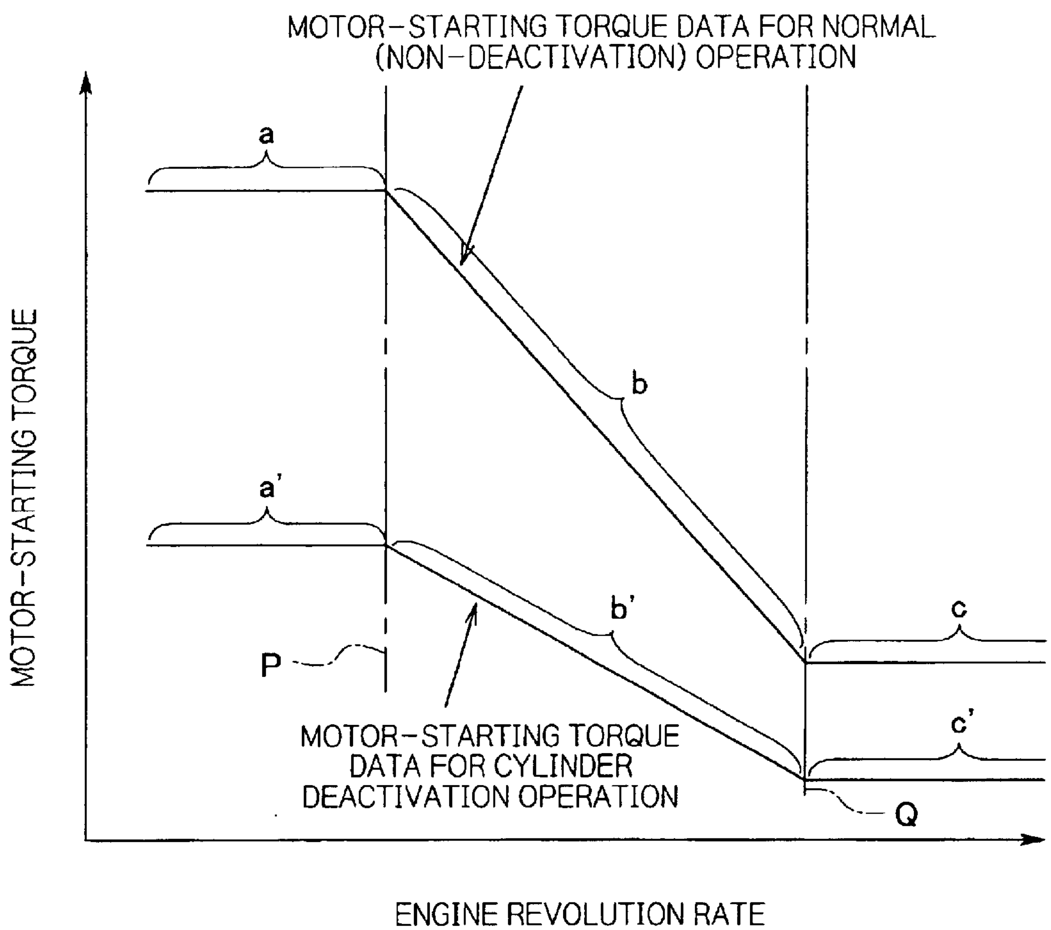
FIG. 11 is a graph showing a relationship between a motor-starting torque and engine revolution rates.

Next, a motor starting output determination operation will be explained with reference to FIG. 6. In a hybrid vehicle, a mode determination operation, in which it is determined how the motor M should be operated, is executed. This "motor starting output determination operation" is executed in a motor starting mode in order to determine motor starting torque. This operation constitutes the starting torque setting section. A specific embodiment for setting torque is shown in FIG. 11 which will be explained below. Note that this operation is repeated at a predetermined period.

In step S201 (the cylinder deactivation operation detecting section), it is determined whether the value of the cylinder deactivation solenoid flag F__CSSOL is "1". When the result of the determination is "YES", which means that the engine is not in a starting mode, and the operation is terminated. When the result of the determination is "NO", which means that the engine is going to be activated, the operation proceeds to step S202.

In step S202 (the deactivation state detecting section), it is determined whether the value of the cylinder deactivation executing flag F__DECCS is "1". When the result of the determination is "YES", which means that the engine is in the deactivation state, the operation proceeds to step S203, and when the result of the determination is "NO", the operation proceeds to step S204.

In step S203, a small torque is selected as the starting torque, and the operation is terminated. In step S204, a normal torque is selected as the starting torque, and the operation is terminated.

Figure 10:
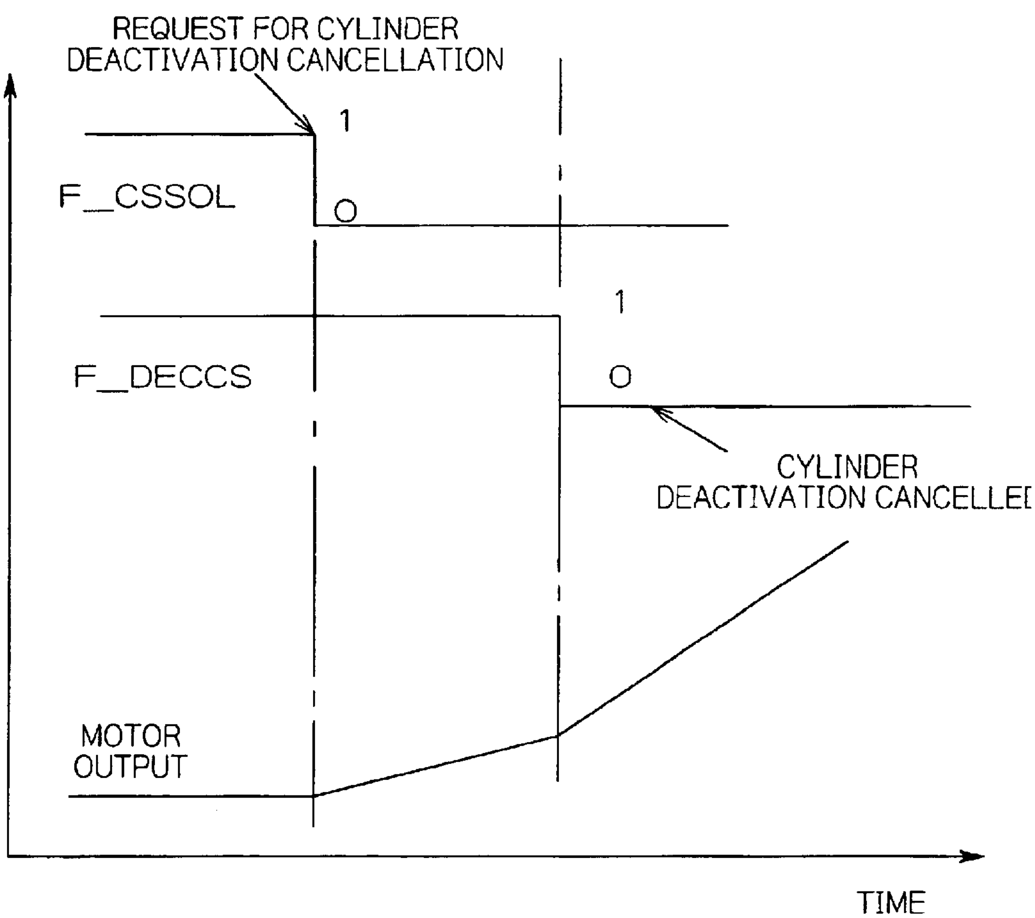
FIG. 10 is a graph showing a relationship between each of flags and a motor power.

More specifically, as shown in FIG. 10, in step S203, a small torque is set as the starting torque from when cancellation of cylinder deactivation is requested, i.e., the cylinder deactivation solenoid flag F__CSSOL alters from "1" to "0" to when the cylinder deactivation operation is cancelled, i.e., the cylinder deactivation executing flag F__DECCS alters from "1" to "0", during which the engine E does not completely return to the normal operation due to such as delay in hydraulic operation, and then a normal torque is selected as the starting torque when the engine E completely returns to the normal operation.

FIG. 11 shows the relationship between a motor-starting torque and engine revolution rates, which is a specific example used for setting torque. The upper line in FIG. 11 represents motor-starting torque values for the normal operation in which the cylinder deactivation is not executed, and the lower line represents motor-starting torque values which are adjusted taking into consideration the reduced engine friction during the cylinder deactivation operation. In other words, the torque for the cylinder deactivation operation represented by the lower line is smaller than the torque for the normal operation represented by the upper line, and the difference between the two lines means engine friction.

As is also shown in FIG. 11, each of the starting torques is set in accordance with the engine revolution rate. For example, in the case of the torque data for the normal operation (represented by the upper line), a fixed torque (e.g., 10 kgm) is set in a range in which the engine revolution rate ranges from 0 to a predetermined value (e.g., 300 rpm), in a range b, torque is gradually decreased in accordance with the engine revolution rate, and again a fixed torque (e.g., 0.5 kgm) is set in a range c in which the engine revolution rate ranges from an idling revolution Q (e.g., 800 rpm) or greater. On the other hand, in the case of the torque data for the cylinder deactivation operation, which are smaller than that for the normal operation, respective torque data are set as a range a' (e.g., 5 kgm), as a range b' (e.g., 5 to 0 kgm), and as a range c' (e.g., 0 kgm).

Because engine friction is reduced during the cylinder deactivation operation, if the starting torque for the normal operation is used, the starting torque is excessive by an amount of the reduced engine friction, and the engine revolution rate rises unnaturally, whereby the marketability and the fuel consumption efficiency of the vehicle are degraded. As a solution for this problem, the smaller starting torques (the ranges a', b', and c' shown in FIG. 11) than in the case of normal operation are used for starting until the engine E completely returns to the normal operation from the cylinder deactivation operation.

Therefore, as shown by the line representing the motor output in FIG. 10, when the engine revolution rate gradually increases while the cylinder deactivation operation is being executed, the motor output, which has been "0" until cancellation of the cylinder deactivation operation is requested, gradually increases as the engine friction gradually increases because the deactivatable cylinders become activated from request of cancellation of the cylinder deactivation to actual cancellation of the cylinder deactivation, and upon completion of cancellation of the cylinder deactivation, the motor output rapidly increases to transitions to the motor output for the normal operation.

Motor Assist Amount Determination Operation

Figure 12:
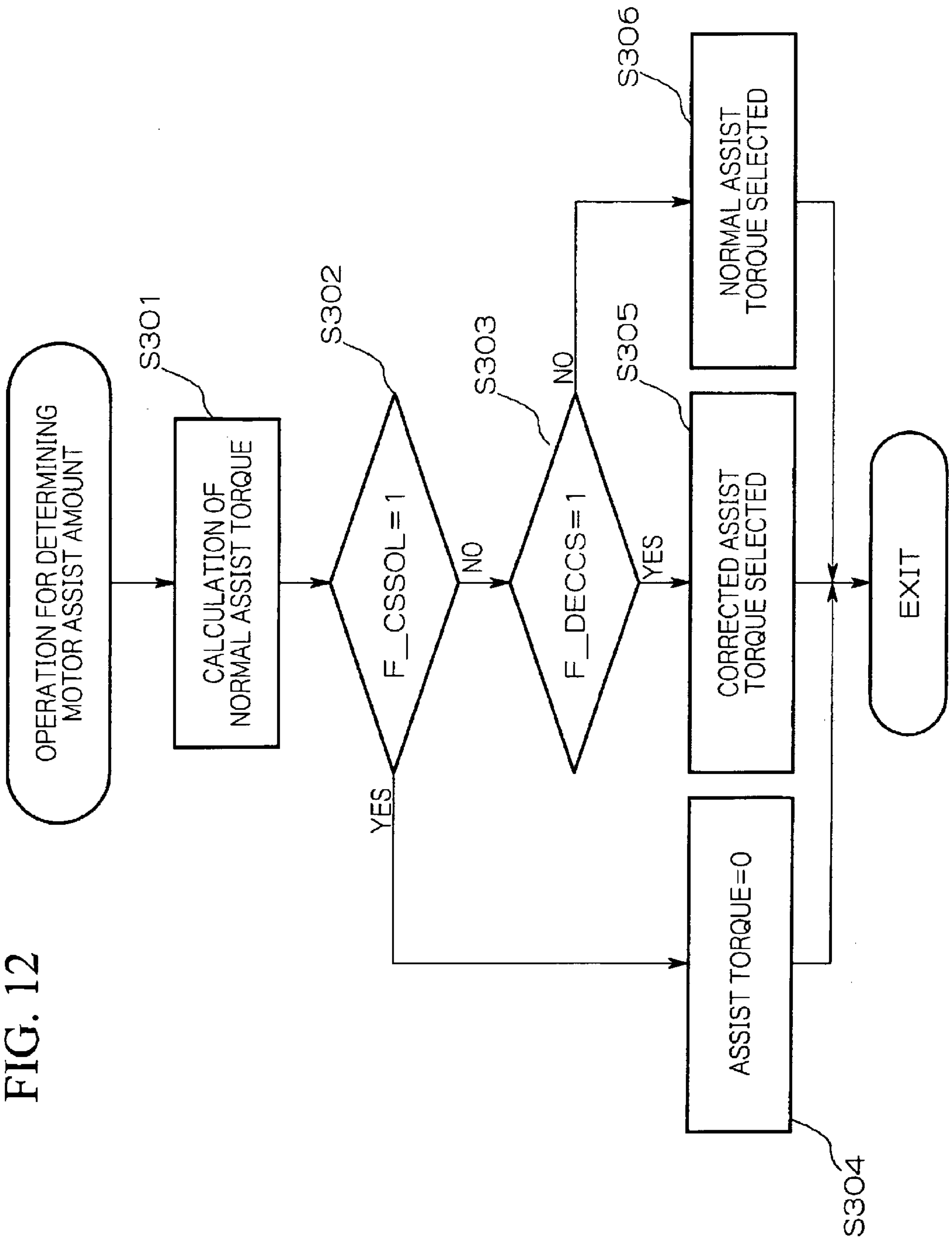
FIG. 12 is a flowchart showing the operation for determining amount of assist by the motor.

Next, a motor assist amount determination operation will be explained, with reference to FIG. 12. In general, in the case of hybrid vehicles, when the acceleration pedal of the vehicle is pressed, which means that the driver of the vehicle intends to accelerate the vehicle, and when the degree of throttle opening exceeds a certain threshold (an assist trigger threshold) which is determined by taking various conditions into consideration, the engine E is assisted by the motor M to accelerate the vehicle.

This motor assist amount determination operation is provided for adjusting the amount of motor assist by the motor M when the acceleration pedal of the vehicle is pressed during the deceleration cylinder deactivation operation, so that, as in the case of the starting torque explained above, the assist torque by the motor is not excessive considering the reduced engine friction due to the deceleration cylinder deactivation operation. Note that this operation will be repeated-at a predetermined period.

In step S301, assuming that the vehicle transitions into an acceleration mode by taking into consideration the amount of acceleration pedal pressing, i.e., the degree of throttle opening, the state of charge of the battery, vehicle speed, electrical consumption in a 12-volt system, etc., a normal assist torque calculation operation is executed in which the amount of assist is calculated, and then the operation proceeds to step S302.

In step S302, it is determined whether the value of the cylinder deactivation solenoid flag F_CSSOL is "1". When the result of the determination is "YES", which means that the vehicle is not in an assist mode, the assist torque is set to "0" in step S304, and the operation is terminated. When the result of the determination is "NO", the operation proceeds to step S303.

In step S303, it is determined whether the value of the cylinder deactivation executing flag F_DECCS is "1". When the result of the determination is "YES", the operation proceeds to step S305. When the result of the determination is "NO", the operation proceeds to step S306.

In step S306, the normal assist torque calculated in step S301 is selected, and the operation is terminated.

In step S305, a corrected value calculated by correcting the normal assist torque calculated in step S301 is selected, and the operation is terminated.

Note that the corrected value is a smaller value than the normal assist torque.

Because engine friction is reduced during the cylinder deactivation operation, if the normal assist torque is used, the assist torque is excessive by an amount of the reduced engine friction, whereby the marketability and the fuel consumption efficiency of the vehicle are degraded. As a solution for this problem, a smaller assist torque than the normal assist torque is used for assisting until the engine E completely returns to the normal operation from the cylinder deactivation operation.

When the assist torque is generated by pressing the acceleration pedal during the deceleration cylinder deactivation operation, a corrected assist torque which is smaller than the normal assist torque by an amount of the reduced engine friction is selected for assisting to avoid applying an excessive torque until the cylinder deactivation operation is cancelled, and when the cylinder deactivation operation is completely cancelled, the normal assist torque is selected for assisting driving power by the normal assist torque.

According to the above embodiment, unnatural increase in engine revolution rate can be avoided, which will occur in the case in which the normal starting torque is applied by the motor M when the engine does not completely return to the normal operation state, and the engine friction is relative low; therefore, the marketability of the vehicle may be improved, and also fuel consumption efficiency can be improved because electrical energy is saved by preventing an excessive torque from being applied.

In addition, by setting the starting torque in accordance with the engine revolution rate which has a great influence on starting performance of the engine E, the minimum starting torque required for starting can be set, and energy loss and degradation in fuel consumption efficiency can be prevented; thus a preferable energy management can be realized. Furthermore, because the transition from the deceleration cylinder deactivation operation to the normal operation can be smoothly performed, the driver will not experience an unnatural feeling; therefore, the marketability of the vehicle may be improved.

Moreover, when the assist torque is generated by pressing the acceleration pedal during the deceleration cylinder deactivation operation, the corrected assist torque which is smaller than the normal assist torque by an amount of the reduced engine friction is selected for assisting to avoid applying an excessive assist torque until the cylinder deactivation operation is cancelled, and when the cylinder deactivation operation is completely cancelled; accordingly, the drivability and marketability of the vehicle can be improved, energy loss may be reduced, and thus the fuel consumption efficiency of the vehicle can also be improved.

INDUSTRIAL APPLICABILITY

As explained above, according to the present invention, unnatural increase in engine revolution rate can be avoided, which will occur in the case in which the normal starting torque is applied by the motor M when the engine does not completely return to the normal operation state, and the engine friction is relative low; therefore, the marketability of the vehicle may be improved, and also fuel consumption efficiency can be improved by an amount of saved electrical energy due to preventing an excessive torque from being applied.

In addition, according to the present invention, by setting the starting torque in accordance with the engine revolution rate which has a great influence on starting performance of the engine E, the minimum starting torque required for starting can be set, and energy loss and degradation in fuel consumption efficiency can be prevented; thus a preferable energy management can be realized. Furthermore, because the transition from the deceleration cylinder deactivation operation to the normal operation can be smoothly performed, the driver will not feel an unnatural feeling; therefore, the marketability of the vehicle may be improved.

Furthermore, according to the present invention, because the transition from the deceleration cylinder deactivation operation to the normal operation can be smoothly performed, the driver will not feel an unnatural feeling; therefore, the marketability of the vehicle may be improved.

What is claimed is:

1. A motor control device for a vehicle having a deceleration deactivatable engine, wherein, during a deceleration traveling of said vehicle, a fuel cut operation is applied to said engine as well as a deceleration cylinder deactivation operation in which at least one cylinder is deactivated in accordance with a running state of said engine, and said engine is started by a motor when the operation of said engine transitions from the fuel cut operation to a fuel supply operation, said motor control device comprising:

a cylinder deactivation state determining section for determining whether or not said engine is in a cylinder deactivation state;

a cylinder deactivation executing section for executing the cylinder deactivation operation of said engine;

a cylinder deactivation operation detecting section for detecting whether or not said cylinder deactivation executing section is activated; and a starting torque setting section for setting starting torque for starting said engine by said motor, wherein when it is determined, by said cylinder deactivation state determining section, that said engine is in a cylinder deactivation state, and it is determined, by said cylinder deactivation operation detecting section, that said engine is to return to the fuel supply operation, said starting torque setting section sets a smaller staring torque than in the case in which said engine returns to the fuel supply operation from a state in which it is determined, by said cylinder deactivation state determining section, that said engine is not in a cylinder deactivation state.

2. A motor control device for a vehicle having a deceleration deactivatable engine according to claim 1, wherein said starting torque is set in accordance with the running speed of said engine.

3. A motor control device for a vehicle having a deceleration deactivatable engine according to claim 2, wherein said starting torque is set to a fixed value up to a predetermined engine revolution rate, is set so as to decrease as the engine revolution rate increases for the engine revolution rate greater than the predetermined value, and is set to another fixed value for the engine revolution rate greater than an idling revolution.

4. A motor control device for a vehicle having a deceleration deactivatable engine according to claim 1, wherein said vehicle is a hybrid vehicle, and said motor is provided to drive said vehicle.

* * * * *